United States Patent
Orisich et al.

(10) Patent No.: US 9,052,095 B2
(45) Date of Patent: Jun. 9, 2015

(54) LIGHT GUIDE FIXTURE SYSTEM

(71) Applicant: John Orisich, Columbus, IN (US)

(72) Inventors: John Orisich, Columbus, IN (US); Joseph Scheller, Columbus, IN (US)

(73) Assignee: Valeo North America, Inc., Seymour, IN (US)

( * ) Notice: Subject to any disclaimer, the term of this patent is extended or adjusted under 35 U.S.C. 154(b) by 0 days.

(21) Appl. No.: 13/632,496

(22) Filed: Oct. 1, 2012

(65) Prior Publication Data
US 2014/0092601 A1    Apr. 3, 2014

(51) Int. Cl.
| | |
|---|---|
| F21V 29/00 | (2006.01) |
| F21V 17/04 | (2006.01) |
| F21V 17/02 | (2006.01) |
| F21S 8/10 | (2006.01) |
| F21V 8/00 | (2006.01) |
| B60Q 1/00 | (2006.01) |
| F21Y 101/02 | (2006.01) |

(52) U.S. Cl.
CPC ............. *F21V 17/02* (2013.01); *F21S 48/1241* (2013.01); *F21S 48/2225* (2013.01); *F21S 48/225* (2013.01); *F21S 48/2293* (2013.01); *B60Q 1/0011* (2013.01); *F21Y 2101/02* (2013.01); *G02B 6/0081* (2013.01); *G02B 6/0088* (2013.01); *G02B 6/0091* (2013.01); *F21V 29/763* (2015.01)

(58) Field of Classification Search
CPC ........... F21S 8/038; F21S 8/08; F21S 8/2225; F21S 8/2237; F21S 8/225; F21S 8/2293; F21S 48/10; F21S 48/1241; B60Q 1/0011; B60Q 1/0029; B60Q 1/0064; B60Q 1/04; B60Q 1/0433; B60Q 1/2626; B60Q 1/2615; B60Q 1/2696; G02B 6/001; G02B 6/0081; G02B 6/0083; G02B 6/0086–6/0093; F21V 17/002–17/005; F21V 17/04; F21V 17/00; F21V 17/107
USPC ............ 362/473–476, 544–547, 217.12, 294, 362/60, 580, 494, 319, 322, 323, 281–283, 362/270, 508, 311.01, 581, 509, 511, 362/512–519; 248/228.3, 202.1, 207, 248/144–145
See application file for complete search history.

(56) References Cited

U.S. PATENT DOCUMENTS

| | | | |
|---|---|---|---|
| 7,527,386 B1 * | 5/2009 | Salinas Fox et al. | 362/29 |
| 7,535,727 B2 * | 5/2009 | Tokida | 361/760 |
| 2005/0128744 A1 * | 6/2005 | You et al. | 362/241 |
| 2008/0205055 A1 * | 8/2008 | Schug et al. | 362/246 |
| 2008/0253144 A1 * | 10/2008 | Dolson et al. | 362/547 |

(Continued)

*Primary Examiner* — Jong-Suk (James) Lee
*Assistant Examiner* — Zheng Song
(74) *Attorney, Agent, or Firm* — Jacox, Meckstroth & Jenkins

(57) ABSTRACT

A light guide fixture system (10) includes a light guide (20) and a fixturing cassette (18). The guide (20) includes and a mounting surface (26) having a mounting feature (30) and a locating feature (28) for engaging a locating feature (72) of a light module (64) and align the guide (20) with respect to a light engine (12). The cassette (18) includes a light guide-receiving region (42) for receiving the mounting surface (26), a mounting feature (52), and a mounting region (44) for mounting the system (10) to the light module (64). The mounting features (30, 52) allow translational motion of the cassette (18) relative to the guide (20) when the guide (20) is received in the light guide-receiving region (42) while allowing the guide (20) to remain in the predetermined position. The cassette (18) secures the guide (20) to the light module (64).

21 Claims, 10 Drawing Sheets

(56) References Cited

U.S. PATENT DOCUMENTS

| | | | |
|---|---|---|---|
| 2008/0310176 A1* | 12/2008 | Hirni et al. | 362/470 |
| 2009/0091944 A1 | 4/2009 | de Lamberterie | |
| 2009/0273935 A1* | 11/2009 | Woodward | 362/317 |
| 2010/0020561 A1* | 1/2010 | An | 362/516 |
| 2010/0208480 A1* | 8/2010 | Matsunaga | 362/509 |
| 2011/0096562 A1* | 4/2011 | Lambert | 362/545 |
| 2012/0217897 A1* | 8/2012 | Gordin et al. | 315/294 |

* cited by examiner

LIGHT GUIDE FIXTURE SYSTEM

CROSS-REFERENCE TO RELATED APPLICATIONS

Not applicable.

FIELD

The present application relates to light emitting diode (LED) based light sources, and in particular to a light guide fixture system.

BACKGROUND

Solid state light-emitting lamps (such as light emitting diodes (LED lamps)) are becoming increasingly more popular as sources of illumination in motor vehicles, trains, planes, and the like. LED lamps provide numerous benefits including, but not limited, increased efficiency and lifespan. One type of LED lamp features a light guide which receives light emitted from the LED and redirects the light in another direction. An example of a light guide is disclosed in U.S. Patent Publication No. 2009/0091944 (de Lamberterie), assigned to Valeo Vision. With reference to FIG. 1 and the abstract thereof, de Lamberterie discloses a lighting or signaling device E which comprises at least one light source S and at least one guide N for the light rays between the source S and an exit face B. The guide N has an exit edge Ne applied against the source S.

As may be appreciated, the alignment between the guide N and the source S is an important consideration in the overall performance of the lighting device E. If the guide N and the source S are not properly aligned, then the light rays emitted from the source S will not be efficiently reflected by the guide N.

Unfortunately, aligning the guide N and the source S may be difficult. For example, the source S may not have sufficient size, strength, or structural rigidity to secure the guide N directly to the source S. While it may be possible to secure the guide N to a heat sink associated with the source S, this may create an undesirable amount of tolerance stack up between the guide N and the source S during assembly. The tolerance stack up between the guide N and the source S may result from the accumulated variation between the guide N and the source S due to the dimensions and tolerances when assembling the lighting device E. If the tolerance stack up between the guide N and the source S is too large, then the guide N may be not properly aligned with respect to the source S and performance of the lighting device E will be decreased. Moreover, because the guide N has very limited inherent structural strength and is a total internal reflection (TIR) device, it may be difficult to secure the guide N directly. The guide N should also be capable maintaining the desired relationship to the source S after experiencing vibration and shock during normal use. Accordingly, heretofore there has not been an efficient manner of aligning the guide N and the source S relative to one another.

BRIEF DESCRIPTION OF THE DRAWINGS

Reference should be made to the following detailed description which should be read in conjunction with the following figures, wherein like numerals represent like parts.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient. Also, it should be understood that the phraseology and terminology used herein is for the purpose of description and should not be regarded as limiting.

DETAILED DESCRIPTION

Figure 1:
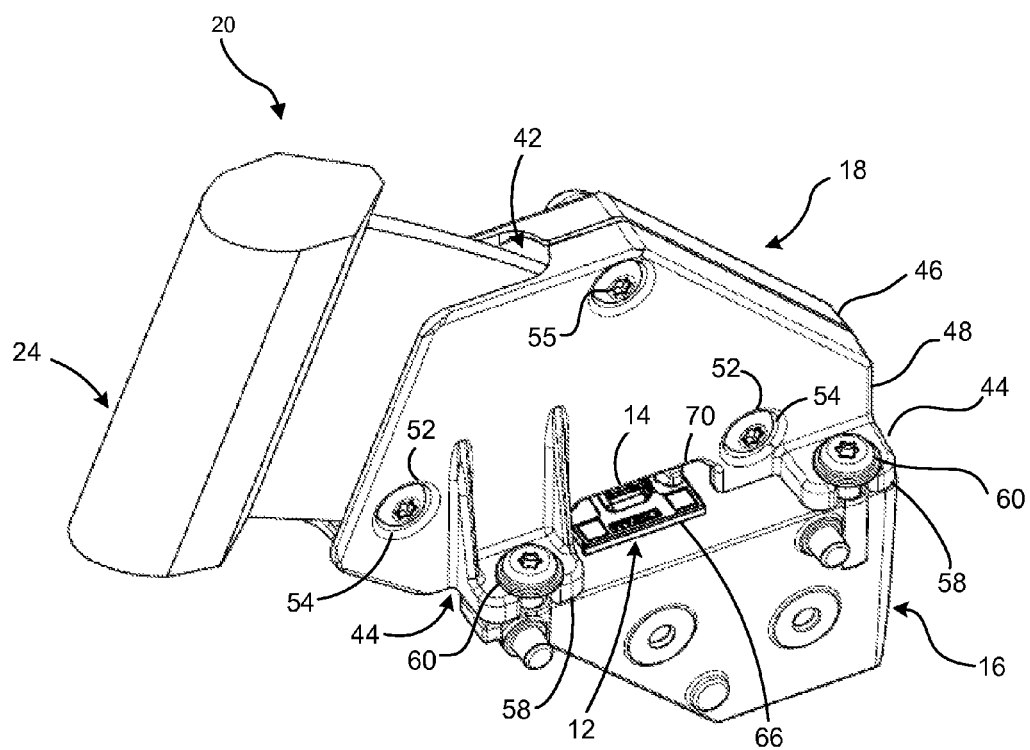
FIG. 1 generally illustrate one embodiment of the light guide fixture system, light engine, and heat sink consistent with the present disclosure.
Figure 2:
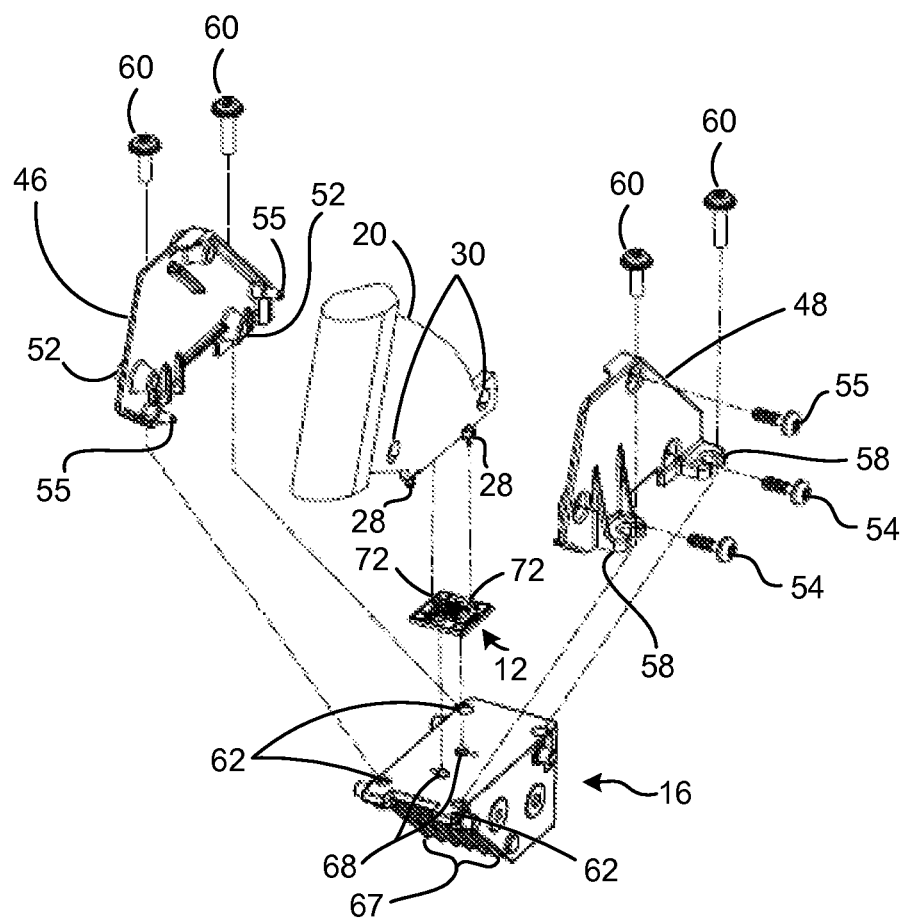
FIG. 2 generally illustrates an exploded view of the light guide fixture system, light engine, and heat sink illustrated in FIG. 1.

Turning now to the figures, FIG. 1 generally illustrates one embodiment of a light guide fixture system 10, a light engine 12 having one or more solid state light emitting elements (e.g., a light emitting diode (LED) 14), and a heat sink 16. FIG. 2 generally illustrates an exploded view of the light guide fixture system 10, light engine 12, and heat sink 16 illustrated in FIG. 1. As explained herein, the light guide fixture system 10 includes a fixturing cassette 18 configured to secure a light guide 20 with respect to the LED 14 of the light engine 12 in a predetermined alignment such that light emitted from the LED 14 is reflected out of the light guide 20. The light guide fixture system 10, light engine 12, and heat sink 16 may form part of a lighting or signaling device for use, for example, with a motor vehicle, aircraft, railcar, vessel, or the like.

As will be apparent from the following description, a light guide fixture system 10 consistent with one or more embodiments of the present disclosure may provide numerous advantages. For example, the light guide fixture system 10 accurately and quickly locates the light guide 20 with respect to the LED 14. The light guide fixture system 10 also avoids mismatch of parts resulting from the tolerance stack up (whether considered from the viewpoint of a "high-low" or geometric dimensioning and tolerance ("GD&T")) between the light guide 20 and the LED 14. If the light guide and light engine fixturing device were all one piece, such as a one-piece plastics molding, then it would not accommodate the tolerance stack-up between parts. Furthermore, if it were one piece, additional strengthening features would likely be required on the light guide which would detract from its total internal reflection ("TIR") efficiency. The reduced tolerance stack up allows for more accurate alignment between the light guide 20 with respect to the LED 14, further increasing the performance. Accurately and quickly locating the light guide 20 with respect to the LED 14 reduces manufacturing costs and allows the light guide 20 to operate efficiently, thereby increasing the performance of the light guide 20. The increased performance of the light guide 20 may allow for lower power and less expensive LEDs 14 while still maintaining the desired optical performance. The lower power and less expensive LEDs 14 may have the additional benefit of reducing the size of the heat sink 16. As may be appreciated, the heat sink 16 in a LED lamp may account for a substantial portion of the overall costs of the LED lamp due to the high costs of the material (such as aluminum, copper, and alloys thereof) as well as the manufacturing costs to produce the heat sink 16. As such, reducing the size of the heat sink 16 further decreasing the manufacturing costs. Moreover, the light guide fixture system 10 also securely fixes the position (i.e., alignment) of the light guide 20 with respect to the LED 14, thereby reducing the potential for misalignment of the light guide 20 either due to improper assembly or vibration/shock during normal use.

Figure 3:
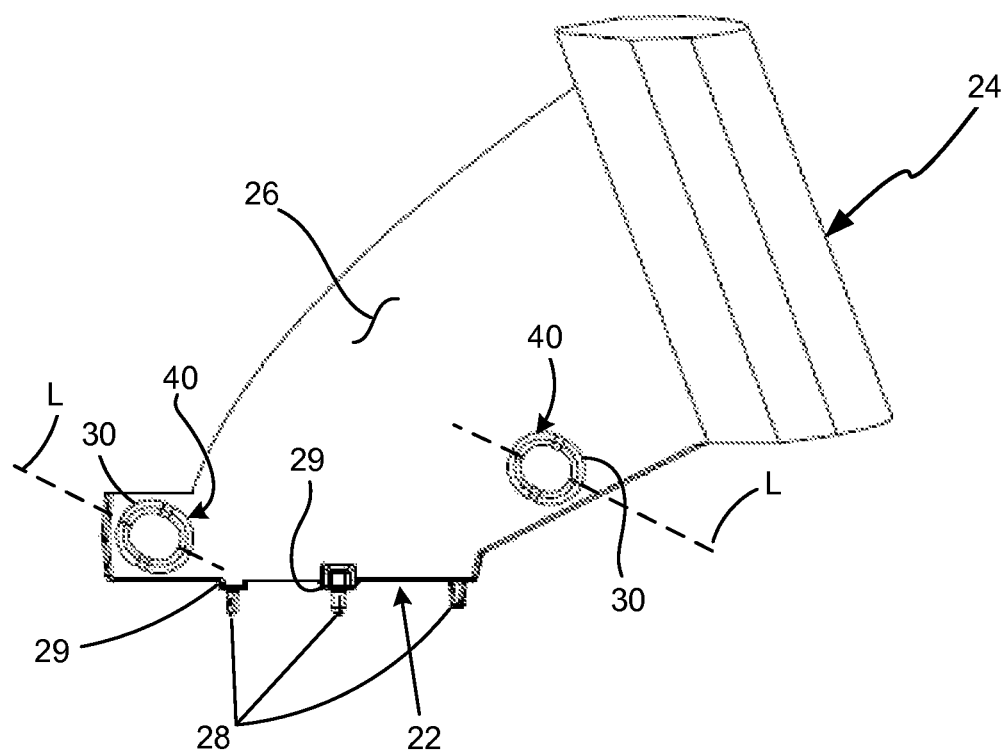
FIG. 3 generally illustrates a side perspective view of the light guide of FIG. 1.

Turning now to FIG. 3, one embodiment of a light guide 20 consistent with the present disclosure is generally illustrated. The light guide 20 includes a light entrance window 22, a light exit face 24, and a mounting surface 26. Light emitted from the LED 14 of the light engine 12 (see FIG. 1) enters through the light entrance window 22 and is internally reflected within the light guide 20 such that the light is emitted from the light exit face 24. The specific design of the optical characteristics of the light guide 20 will depend upon the intended application. The light guide 20 is made from a transparent and/or semi-transparent material such as, but not limited to, plastic materials or glass. The light guide 20 may be molded as a single, unitary component.

The light guide 20 also includes one or more locating features 28. The locating features 28 are configured to engage with corresponding locating features (not shown in FIG. 3, but described herein) of the light engine 12 and/or the heat sink 16 and align or locate the light guide 20 (for example, the light entrance window 22) with respect to the light engine 12 (for example, the LED 14) such that the light emitted from the light engine 12 enters through the light entrance window 22 at the desired position. Proper alignment of the light guide 20 increases the optical performance of the light guide 20 by maximizing the amount of light that exits the light exit face 24 and minimizing the amount of light which is lost.

In the illustrated embodiment, the locating features 28 include a plurality datum points. For example, one or more locating features 28 may include a pin or protrusion which extends outwardly and away from the light entrance window 22. Optionally, the pins or protrusions include a shoulder 29 which, as explained herein, sets the spacing (e.g., a gap) between the light entrance window 22 and the LED 14.

The illustrated embodiment features three locating features 28. The three locating features 28 may define a plane which sets the planar relationship between the light entrance window 22 and the LED 14. It should be appreciated, however, that the light guide 20 may include fewer than three locating features 28 (e.g., one or two locating features 28) or more than three locating features 28 depending on the intended application.

As may be appreciated, the cooperation between the locating features 28 of the light guide 20 and the corresponding locating features of the light engine 12 and/or the heat sink 16 (not shown in FIG. 3, but described herein) provides advantages. For example, the cooperation of the locating features allows the light guide 20 to be quickly and easily aligned with respect to the light engine 12 (e.g., the LED 14), thereby facilitating the assembly process. In addition, aligning the locating features 28 of the light guide 20 with the corresponding locating features of the light engine 12 may reduce tolerance stack up between the LED 14 and the light guide 20 during assembly. Reducing the tolerance stack up between the LED 14 and the light guide 20 (i.e., the accumulated variation between the LED 14 and the light guide 20 due to the dimensions and tolerances when assembling) allows for a more accurate alignment of the light guide 20 relative to the light engine 12, thereby increasing the optical performance of the light guide 20.

While the locating features 28 of the light guide 20 are illustrated proximate to the light entrance window 22, it should be appreciated that one or more of the locating features 28 may be located remotely from the light entrance window 22. Additionally, while the locating features 28 of the light guide 20 are illustrated as pins or protrusion extending outwardly and away from the light entrance window 22, it should be appreciated that one or more of the locating features 28 may include an aperture configured to engage with a corresponding protrusion (locating feature) extending from the light engine 12 and/or heat sink 16. Any of the protrusions or apertures may optionally have corresponding locking tapers which further aid in alignment of the light guide 20 relative to the LED 14.

The light guide 20 also includes one or more mounting features 30. The mounting features 30 of the light guide 20 are configured to engage with corresponding mounting features of the fixturing cassette 18 (not shown in FIG. 3, but described herein) and secure the position of the light guide 20 (for example, the light entrance window 22) with respect to the light engine 12 (for example, the LED 14 as shown in FIG. 1) and the heat sink 16 such that the light emitted from the light engine 12 enters through the light entrance window 22 at the desired position. One or more of the mounting features 30 of the light guide 20 may include apertures such as grooves, slots, or raceway tracks (which may extend partially or entirely through the light guide 20), protrusions and/or bosses which extend outwardly from the mounting surface 26 of the light guide 20. The configuration of the mounting features of the fixturing cassette 18 (described more herein) have a corresponding, mating design.

In the illustrated embodiment, the mounting features 30 of the light guide 20 include apertures. The apertures are shown as elongated slots extending through a portion of the mounting surface 26 of the light guide 20. Optionally, the elongated slot mounting features 30 may include longitudinal axes L configured to allow the fixturing cassette 18 to move relative to the light guide 20 after the light guide 20 has been aligned with the light engine 12. This translational movement allows light guide 20 to remain in the desired alignment with respect to the light engine 12 while also allowing the fixturing cassette 18 to be aligned with and secured to the heat sink 16 after the light guide 20 has been aligned with the light engine 12. As such, mounting features of the light guide 20 and the fixturing cassette 18 are capable of translational movement relative to one another.

Optionally, one or more of the elongated slots includes one or more tapered surfaces 40 configured to engage with the mounting features of the fixturing cassette 18. For example, the tapered surfaces 40 may be located on one side (or both sides) of the light guide 20. The biasing force provided by the interaction of the tapered surface 40 with the mounting features of the fixturing cassette may urge or bias the light guide 20 towards the light engine 12 thereby applying a force to ensure that the locating features 28 of the light guide 20 remain aligned with the corresponding locating features of the light engine 12 and/or the heat sink 16 as described herein. It should be appreciated, however, that one or more of the tapered surfaces 40 may be provided on the corresponding mounting features of the fixturing cassette 18.

Figure 4:
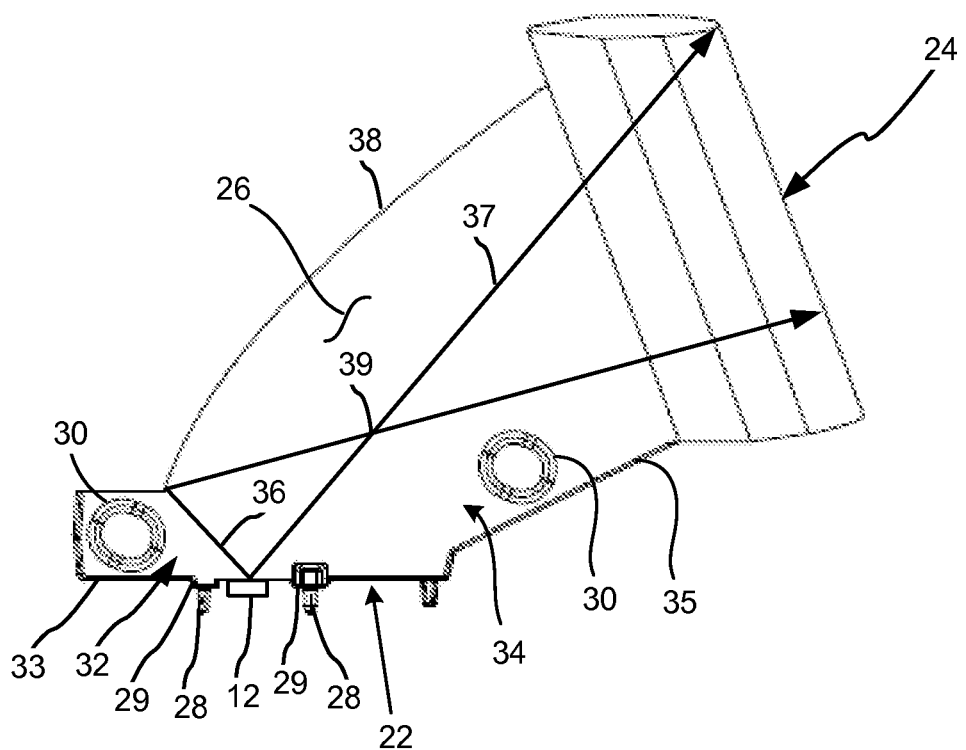
FIG. 4 generally illustrates the dead zones of the light guide illustrated in FIG. 3.

The mounting features 30 of the light guide 20 are arranged in one or more "dead zones" in the mounting surface 26 of the light guide 20. As used herein, the term "dead zone" refers to areas of the light guide 20 where light emitted from the light engine 12 and entering through the light entrance window 22 does not travel when reflected out of the light exit face 24. It may be appreciated that the size, location, and shape of the dead zone will depend upon the specific design of the light guide 20. Turning to FIG. 4, an illustrative embodiment of one example of the location of the dead zones 32, 34 is generally illustrated for exemplary purposes only. As may be seen, a first dead zone 32 is defined by an outer perimeter or periphery 33 of the light guide 20 extending rearwardly from light entrance window 22 and the intersection of the first pathway 36 of the light rays defining the lower pathway with the convex curved rear edge 38. A second dead zone 34 is defined by an outer perimeter or periphery 35 of the light guide 20 extending frontwardly from light entrance window 22, a first portion extending from the light entrance window 22 along the second pathway 37 of the light rays extending from the light entrance window 22 and defining the upper pathway with the convex curved rear edge 38 and ending at an intersection 39 of the first and second pathways 36, 37, as well as a second portion extending from the intersection 39 along the first pathway 36 towards the light exit face 24. Again, it should be appreciated that the size, location, and shape of the dead zones 32, 34 will depend upon the specific design of the light guide 20 and that the dead zones 32, 34 illustrated in FIG. 4 are provided for exemplary purposes only.

Figure 5:
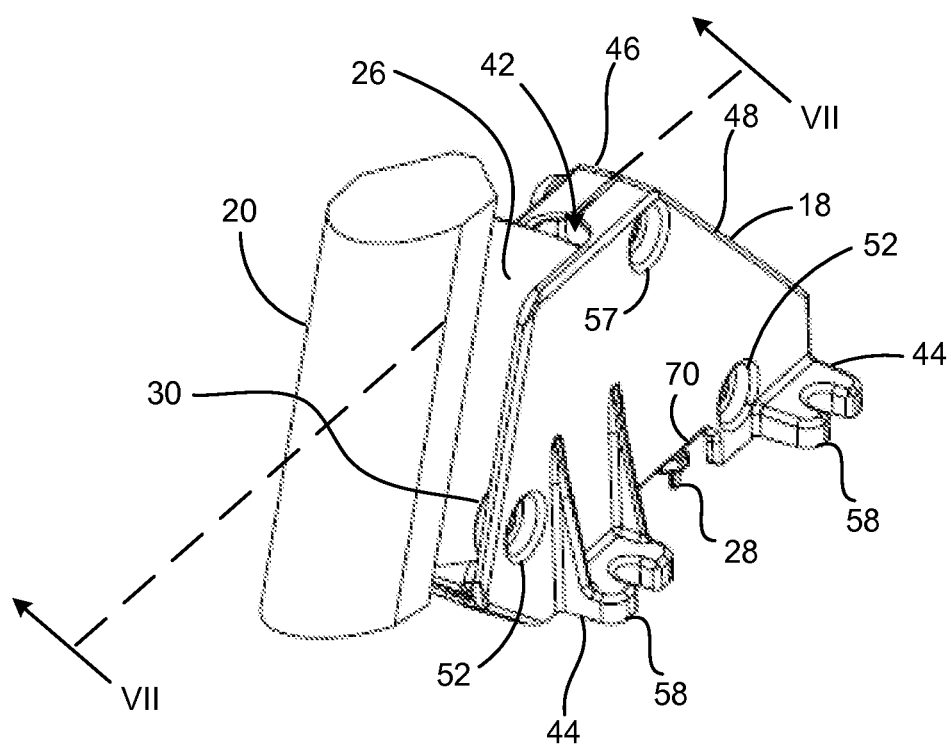
FIG. 5 generally illustrates generally illustrate one embodiment of the light guide fixture system including a light guide and a fixturing cassette consistent with the present disclosure.
Figure 6:
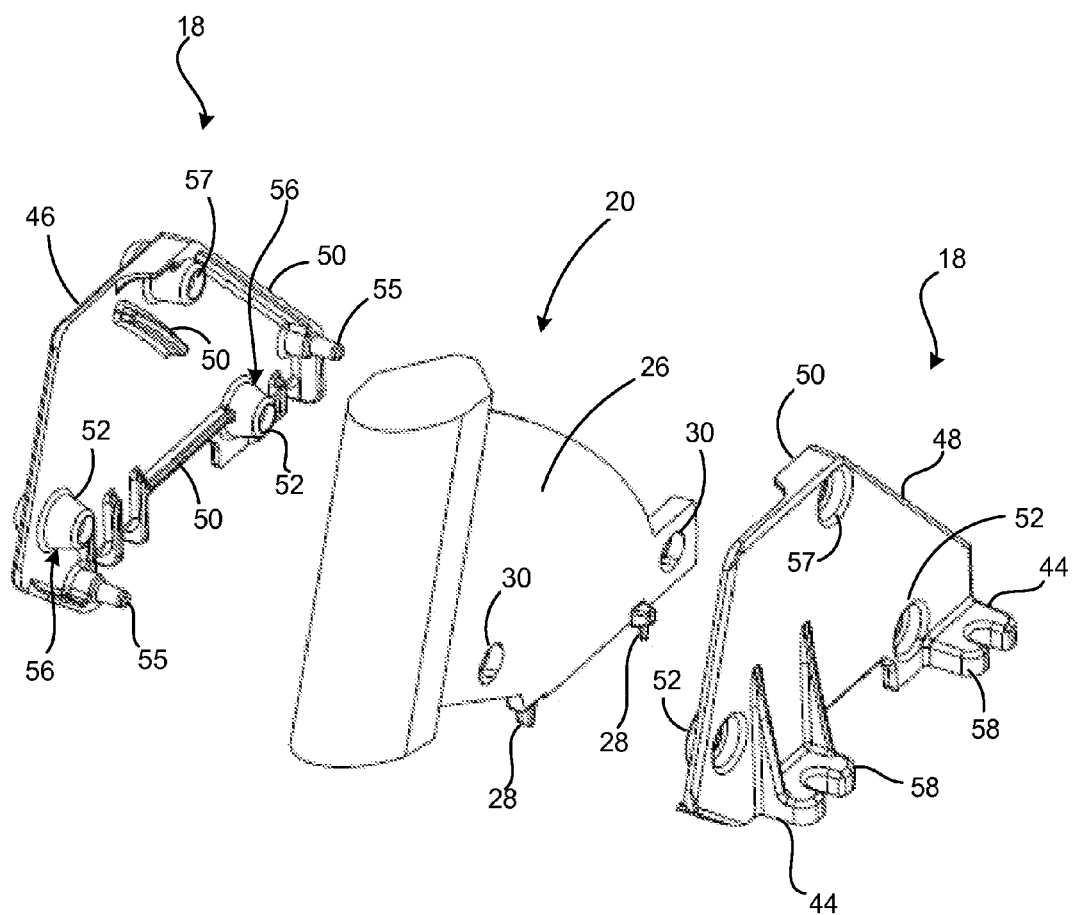
FIG. 6 generally illustrates an exploded view end of the light guide fixture system of FIG. 5.

Turning now to FIGS. 5-6, one embodiment of the light guide system 10 is generally shown without the heat sink 16. In particular, FIG. 5 is an assembled view illustrating the fixturing cassette 18 and the light guide 20 of the light guide system 10. FIG. 6 is an exploded view illustrating fixturing cassette 18 and the light guide 20 of the light guide system 10.

As discussed, the fixturing cassette 18 is configured to secure the light guide 20 with respect to the LED 14 of the light engine 12 in a predetermined alignment such that light emitted from the LED 14 is reflected out of the light guide 20. The fixturing cassette 18 defines a light guide-receiving region 42 configured to receive at least a portion of the mounting surface 26 of the light guide 20. As best illustrated in FIGS. 5 and 6, the fixturing cassette 18 includes a first portion 46 and at least a second portion 48. The first and second portions 46, 48 are configured to be secured, coupled, or otherwise mounted together to define a compartment or cavity therebetween, at least a portion of which includes the light guide-receiving region 42. The size, shape, and configuration of the light guide-receiving region 42 will depend upon the intended application including, but not limited to, the size and shape of the mounting surface 26 of the light guide 20, but the light guide-receiving region 42 should be configured to be able to secure the light guide 20 therein as described herein. For example, the light guide-receiving region 42 may have a size and shape slightly larger than the portion of the mounting surface 26 which is intended to be received within the light guide-receiving region 42 to allow the fixturing cassette 18 to move relative to the light guide 20 once the light guide 20 is aligned with the light engine 12. Again, the size and shape may depend upon the desired range of adjustment (translational movement) between the fixturing cassette 18 and the light guide 20.

Optionally, the first and/or second portions 46, 48 may include one or more strengthening ribs 50. One or more of the strengthening ribs 50 may engage against an opposite portion 44, 46 of the fixturing cassette 18 to increase the strength and rigidity of the fixturing cassette 18. One or more of the strengthening ribs 50 may also (or alternatively) engage against a portion of the mounting surface 26 of the light guide 20 to aid in securing/fixing the alignment of the light guide 20 with respect to the fixturing cassette 18 as described herein.

As mentioned herein, the fixturing cassette 18 also includes one or more mounting features 52 configured to engage with corresponding mounting features 30 of the light guide 20 and secure the position of the light guide 20 (for example, the light entrance window 22) with respect to the light engine 12 (for example, the LED 14 as shown in FIG. 1) and the heat sink 16 such that the light emitted from the light engine 12 enters through the light entrance window 22 at the desired position. One or more of the mounting features 52 of the fixturing cassette 18 may include apertures such as grooves, slots, or raceway tracks (which may extend partially or entirely through one or more portions 46, 48 of the fixturing cassette 18), protrusions and/or bosses which extend inwardly from the portions 46, 48 of the fixturing cassette 18. The configuration of the mounting features 30 of the light guide 20 may have a corresponding design as described herein.

In the illustrated embodiment, the first portion 46 of the fixturing cassette 18 includes mounting features 52 in the form of bosses or protrusions extending generally inwardly toward the second portion 48 of the fixturing cassette 18. The second portion 48 of the fixturing cassette 18 includes a mounting feature in the form of an aperture through which a fastener (such as, but not limited to, a screw, bolt, or the like). Optionally, the second portion 48 of the fixturing cassette 18 may also include protrusion or the like which extend generally inwardly towards the first portion 46. In the illustrated embodiment, a fastener 54 (not shown for clarity in FIGS. 5-6, but shown in FIGS. 1 and 2) extends through the mounting feature 52 in the second portion 48, through the mounting surface 26 of the light guide 20, and at least partially into the mounting feature 52 of the first portion 46. As the fastener 54 is tightened, the first and second portions 46, 48 are urged towards each other, thereby compressing or "sandwiching" the mounting surface 26 of the light guide 20. It should be appreciated, however, that other types of fasteners may be used to secure the first and second portions 46, 48 of the fixturing cassette 18 together including, but not limited to, clamps, brackets, and the like. Optionally, the fixturing cassette 18 may be provided with additional fasteners 55 (as seen in FIGS. 1, 2, and 6 including, but not limited to, screws, bolts extending through apertures 57, tabs, protrusions, or the like) configured to aid in securing the first and second portions 46, 48 of the fixturing cassette 18 together and/or provide additional clamping force against the mounting surface 26 of the light guide 20.

Optionally, one or more of the mounting features 52 of the fixturing cassette 18 may include a tapered surface 56 (best seen in FIG. 6) which is configured to engage with the corresponding mounting feature 30 of the light guide 20. In one embodiment, the tapered surface 56 of mounting features 52 generally corresponds to the tapered surface 40 of the mounting features 30 such that a locking connection is formed. As noted herein, the tapered surface 56, when urged against the mounting feature 30 of the light guide 20) may create a biasing force which urges or biases the light guide 20 towards the light engine 12 thereby applying a force to ensure that the locating features 28 of the light guide 20 remain aligned with the corresponding locating features of the light engine 12 and/or the heat sink 16.

As noted herein, one or more of the mounting features 52 of the fixturing cassette 18 may optionally include grooves, slots, or raceway tracks (which may extend partially or entirely through one or more portions 46, 48 of the fixturing cassette 18). For example, mounting features 52 may include elongated slots similar to the elongated slot mounting features 30 of the light guide 20 described herein.

The fixturing cassette 18 also includes one or more mounting regions 44 as described herein. The mounting regions 44 are configured to secure the fixturing cassette 18 (and ultimately the light guide 20) to the heat sink 16 and/or the light engine 12. In the illustrated embodiment, the fixturing cassette 18 includes four mounting regions 44 (e.g., two on each portion 46, 48) featuring tabs or protrusions 58 configured to at least partially receive a fastener 60 (best seen in FIGS. 1 and 2) which may be secured into openings 62 (e.g., threaded openings) in the heat sink 16. It should be appreciated that the fixturing cassette 18 may include more than or less than four mounting regions 44 depending on the intended application. Securing the fixturing cassette 18 directly to the heat sink 16 may be advantageous since the heat sink 16 is generally a large, strong, and rigid component.

Alternatively (or in addition), the fixturing cassette 18 may be secured directly to the light engine 12. For example, the fixturing cassette 18 may be secured directly to a portion of the light engine 12 when a separate heat sink 16 is not provided (e.g., in the case when the LEDs 14 of the light engine 12 are mounted to a thermal printed circuit board (PCB) such as a metal core printed circuit board (MCPCB) or the like). Accordingly, in a broad sense, the mounting regions 44 are therefore configured to secure the fixturing cassette 18 (and ultimately the light guide 20) to a light module 64 which includes one or more LEDs 14 mounted to a PCB 66 (see FIG. 1) and a thermal conductive element. The thermal conductive element may include the heat sink 16 and/or a thermal PCB.

Optionally, the fixturing cassette 18 may include a notch or relieved region 70 (as best illustrated in FIG. 1). The notched region 70 may be sized and shaped to allow space for the light engine 12 when the fixturing cassette 18 is secured to the heat sink 16. The notched region 70 may be located in a region proximate to the light entrance window 22 when the light guide 20 is received within the light guide receiving region 42.

Referring back to FIGS. 1 and 2, the heat sink 16 includes one or more structures configured to transfer heat generated by the light engine 12 (e.g., the LEDs 14) to a fluid medium, such as air or liquid. The heat sink 16 is constructed from a material such as, but not limited to, aluminum, copper, or an alloy thereof. The size, shape, and configuration of the heat sink 16 may depend on the intended application (e.g., the desired amount of heat to be transferred). The size and arrangement of heat sink 16 is chosen to maintain the LEDs 14 of light engine 12 at an appropriate operating temperature. The heat sink 16 optionally includes, for example, a plurality of heat-radiating fins 67 configured to increase the surface area of the heat sink 16 and dissipate more heat from the light engine 12 to the surrounding air. The heat-radiating fins 67 include, but are not limited to, straight fins and/or flared fins. It should be appreciated, however, that this is only one example and that the heat sink 16 may include other types of heat radiating/dissipating structures.

As described herein, the heat sink 16 optionally includes one or more openings 62 or the like (e.g., threaded openings) configured to secure the fixturing cassette 18 thereto. It should be appreciated that the coupling between the heat sink 16 and the fixturing cassette 18 is not limited to threaded opening 62. For example, the heat sink 16 may include posts (such as, but not limited to threaded posts), clamps, or the like. The heat sink 16 may also optionally include one or more light engine location features 68. The light engine location features 68 are configured to align and/or secure the light engine 12 to the heat sink 16.

Figure 7:
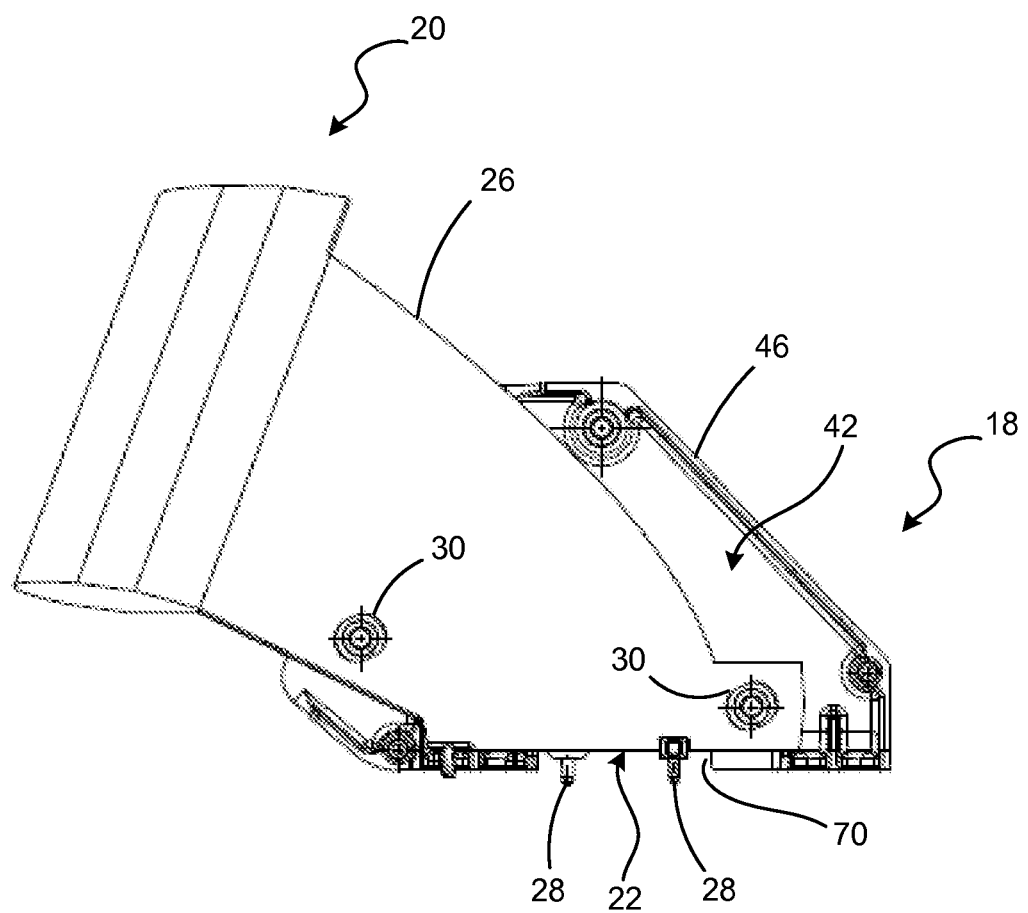
FIGS. 7-10 generally illustrate one embodiment of the steps in the assembly of the light guide fixture system and securing the light guide fixture system to a heat sink consistent with the present disclosure.

Turning now to FIGS. 7-10, one embodiment of the assembly process for securing the light guide 20 with respect to the light engine 12 is generally illustrated. With reference to FIG. 7 (which illustrates the first portion 46 of the fixturing cassette 18 and the light guide 20 of the light guide system 10 taken along line VII-VII of FIG. 5 prior to securing the second portion 48 to the first portion 46) a portion of the mounting surface 26 of the light guide 20 is received within a portion of the light guide receiving region 42 defined by the first portion 46 of the fixturing cassette 18. The light guide 20 is arranged within the portion of the light guide receiving region 42 such that the light entrance window 22 is disposed generally proximate to the notched region 70. Additionally, the mounting features 30 of the light guide 20 are generally aligned with the mounting features 52 of the fixturing cassette 18 (not shown because they are blocked by the light guide 20). For example, the tapered surfaces 56 of the mounting features 52 are aligned with the elongated slot mounting features 30 of the light guide 20.

Figure 8:
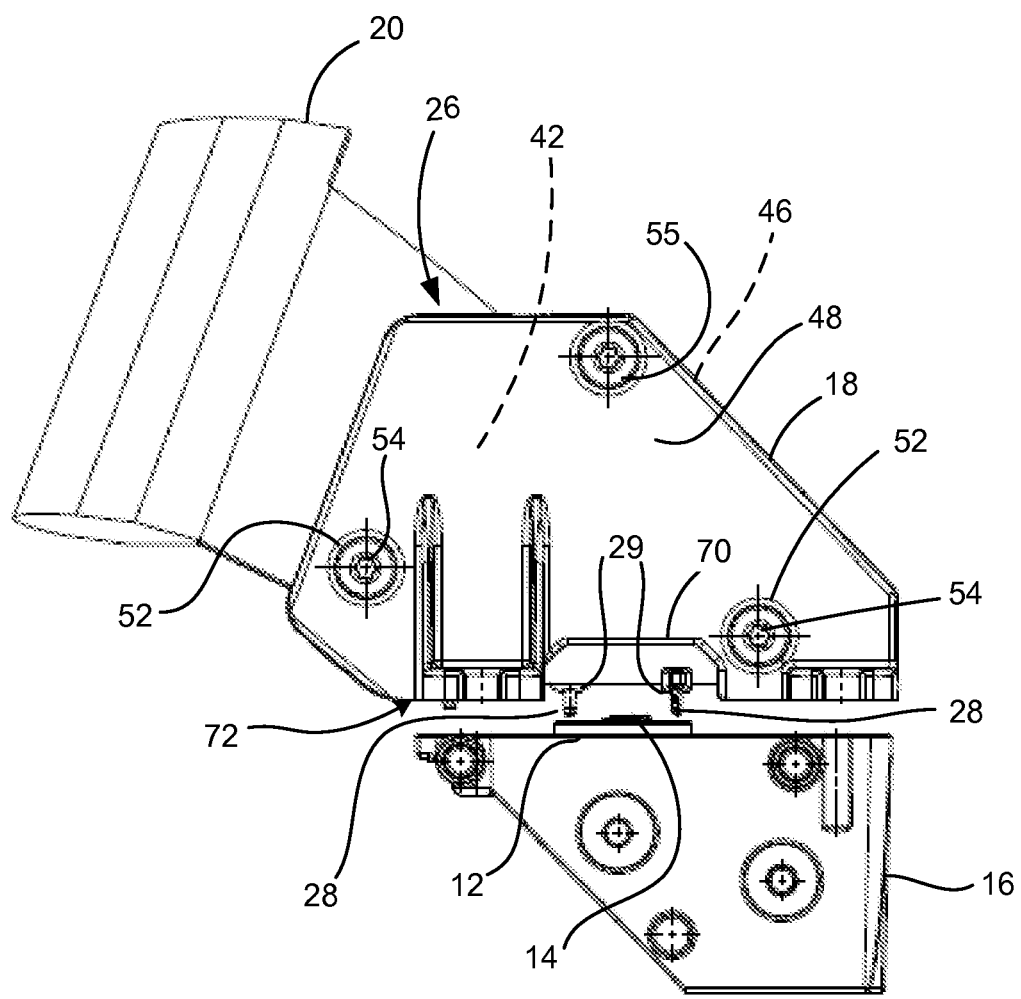
Figure 9:
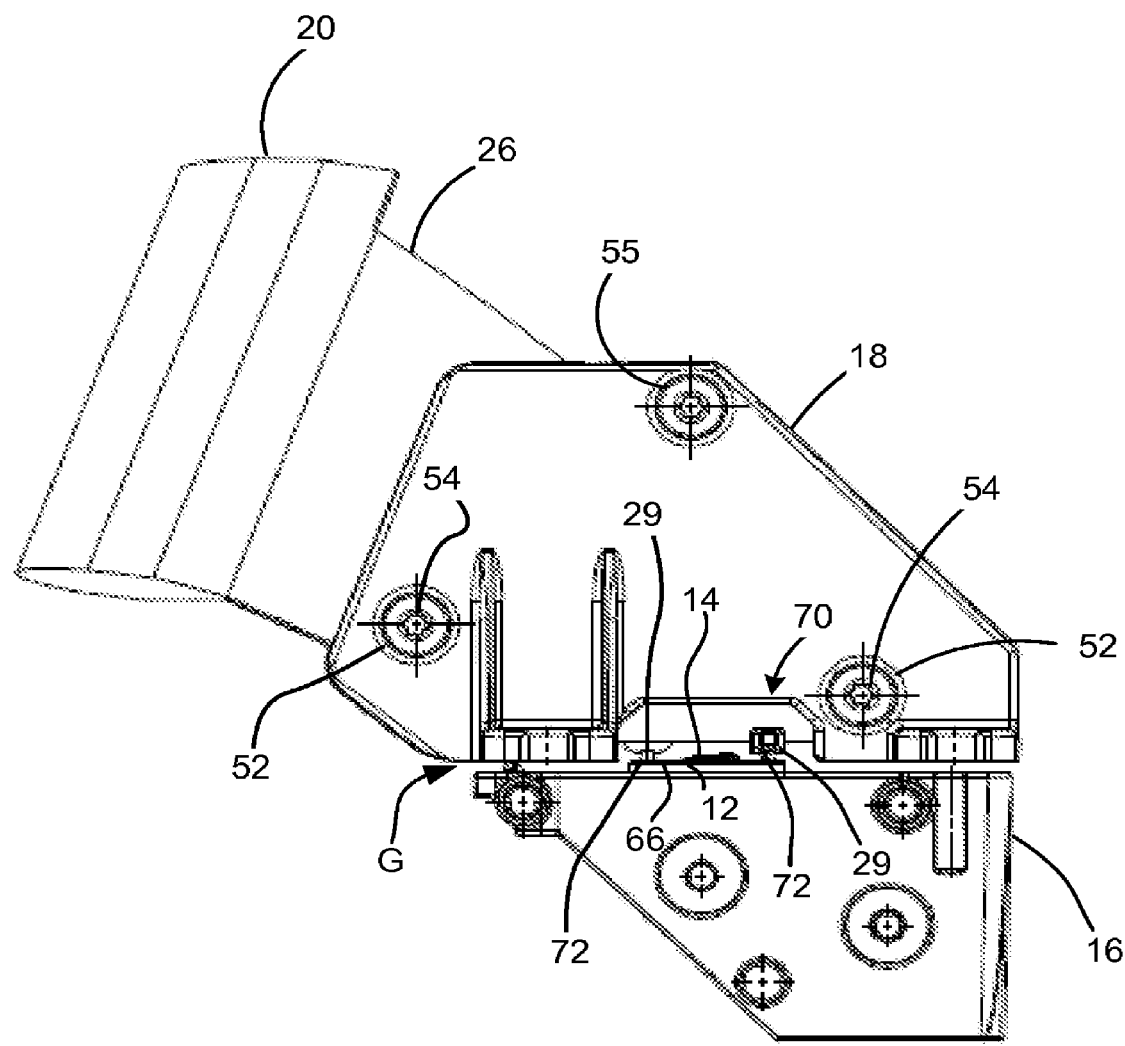

Turning now to FIG. 8, the second portion 48 of the fixturing cassette 18 is shown loosely secured (e.g., partially assembled) to the first portion 46 with the mounting surface 26 of the light guide 20 loosely sandwiched therebetween to form a partially assembled light guide fixture system 10. In particular, the fasteners 54 are advanced through the mounting features 52 of the second portion 48, thought the mounting features 30 of the light guide 20, and secured to the mounting features 52 of the first portion 46. Additionally, one or more supplementary fasteners (e.g., fastener 55) may be used to secure the first and second portions 46, 48.

With the light guide fixture system 10 partially assembled, the locating features 28 of the light guide 20 are aligned with the locating features 72 (see FIGS. 2 and 9) of the light engine 12. The locating features 72 of the light engine 12 may include apertures in the light engine 12 such as, but not limited to, apertures in the PCB 66 and/or heat sink 16) configured to align the light entrance window 22 of the light guide 20 relative to the LED 14. Optionally, the locating features 28 may include shoulders 29 which engage the PCB 66 and/or heat sink 16 thereby setting the desired distance or gap D between the light entrance window 22 and the LED 14 as generally illustrated in FIG. 10.

Figure 10:
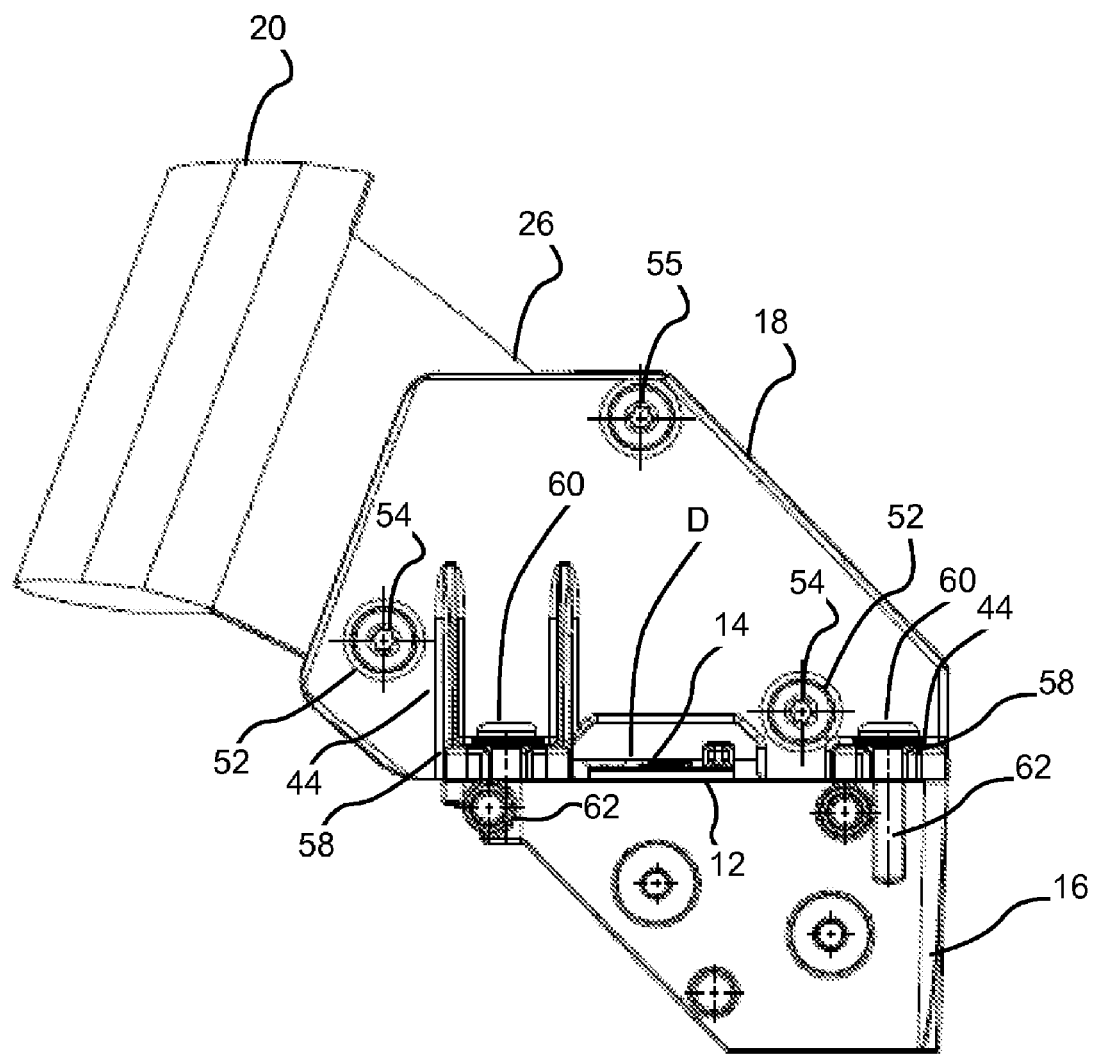

With the light guide 20 aligned relative to the LED 14, mounting features 44 (e.g., tabs 58) of the first and second portions 46, 48 of the fixturing cassette 18 are aligned with the openings 62 of the heat sink 16 and the first and second portions 46, 48 are secured to the openings 62 using fasteners 60 as generally illustrated in FIG. 10. Turning back to FIG. 9, it may be seen that there is a gap G between the fixturing cassette 18 of the partially assembled light guide fixture system 10 and the heat sink 16. As described herein, the first and second portions 46, 48 of the fixturing cassette 18 are capable of translational movement with respect to the light engine 12 and the heat sink 16 while maintaining the alignment of the light guide 20 with respect to the LED 14. As a result, the first and second portions 46, 48 of the fixturing cassette 18 may move such that the mounting features 44 can be aligned with the openings 62 of the heat sink 16 without moving the light guide 20 relative to the LED 14. Once the fixturing cassette 18 is aligned with and secured to the heat sink 16, the fasteners 54, 55 may be tightened to provide a clamping force against the mounting surface 26 of the light guide 20, thereby securing/locking the position of the light guide 20 with respect to the LED 14. As noted herein, the tapered surfaces 40, 56 of the mounting features 30, 52 may urge or bias the locating features 28 of the light guide 20 against the locating features 72 of the light engine 12, thereby ensuring that the light guide 20 remains aligned with the LED 14.

Accordingly, one embodiment of the present disclosure features a light guide fixture system comprising a light guide and a fixturing cassette. The light guide includes a light entrance window, a light exit face, and a mounting surface. The mounting surface includes at least one mounting feature and at least one locating feature configured to engage with a corresponding locating feature of a light module and align the light entrance window in a predetermined position with respect to a solid state light-emitting element of the light module. The fixturing cassette includes at least one mounting feature and a mounting region configured to fixedly mount the light guide fixture system to the light module. The fixturing cassette further defines a light guide-receiving region configured to receive at least a portion of the mounting surface therein. The mounting features of the light guide and the fixturing cassette are configured to allow translational motion of the fixturing cassette relative to the light guide when the light guide is received in the cassette light guide-receiving region while allowing the light entrance window of the light guide to remain in the predetermined position relative to the light-emitting element. The fixturing cassette is further configured to secure the light guide to light module.

According to another embodiment, the present disclosure features a method of locating and fixing a light guide relative a solid state light-emitting element of a light module. The method includes providing a light guide having a light entrance window, a light exit face, and a mounting surface, the mounting surface comprising at least one mounting feature and at least one locating feature; providing a fixturing cassette including at least one mounting feature and a mounting region, the fixturing cassette further defining a light guide-receiving region configured to receive at least a portion of the mounting surface therein; aligning a locating feature of the light guide with a corresponding locating feature of a light module to align the light entrance window in a predetermined position with respect to the solid state light-emitting element of the light module; when the light guide is received in the cassette light guide-receiving region, translating the fixturing cassette relative the light guide such that the mounting region is aligned with and secured to the light module while maintaining the light entrance window of the light guide in a predetermined position relative to the light-emitting element; securing the fixturing cassette to the light module; and clamping the fixturing cassette against the mounting surface to secure the light guide to the light module.

As used in any embodiment herein, "circuitry" may comprise, for example, singly or in any combination, hardwired circuitry, programmable circuitry, state machine circuitry, and/or firmware that stores instructions executed by programmable circuitry. In at least one embodiment, the light module and/or electronics module may include a controller, photodetector, PWM circuitry and/or driver circuitry (not shown) that may collectively or individually comprise one or more integrated circuits. An "integrated circuit" may be a digital, analog or mixed-signal semiconductor device and/or microelectronic device, such as, for example, but not limited to, a semiconductor integrated circuit chip.

As used herein, the designation (1)-(n) in connection with reference numerals should be interpreted as a repetition of like components (which may be identical, similar, or different). The terms "first," "second," and the like herein do not denote any order, quantity, or importance, but rather are used to distinguish one element from another, and the terms "a" and "an" herein do not denote a limitation of quantity, but rather denote the presence of at least one of the referenced item.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

Reference in the specification to "one embodiment" or "an embodiment" of the present disclosure means that a particular feature, structure or characteristic described in connection with the embodiment is included in at least one embodiment of the present disclosure. Thus, the appearances of the phrase "in one embodiment" appearing in various places throughout the specification are not necessarily all referring to the same embodiment.

While the principles of the present disclosure have been described herein, it is to be understood by those skilled in the art that this description is made only by way of example and not as a limitation as to the scope of the invention. The features and aspects described with reference to particular embodiments disclosed herein are susceptible to combination and/or application with various other embodiments described herein. Such combinations and/or applications of such described features and aspects to such other embodiments are contemplated herein. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

THE FOLLOWING IS A NON-LIMITING LIST OF REFERENCE NUMERAL USED IN THE SPECIFICATION 10 light guide fixture system
12 light engine
14 LED
16 heat sink
18 fixturing cassette
20 light guide
22 light entrance window
24 light exit face
26 mounting surface
28 locating feature
29 shoulder
30 mounting feature
32 dead zone
33 outer perimeter
34 dead zone
35 outer perimeter
36 first light ray path
37 second light ray path
38 convex curved rear edge
39 intersection
40 tapered surface
42 light guide receiving region
44 mounting region
46 first portion
48 second portion
50 strengthening ribs
52 mounting feature
54 fastener
55 additional fastener 56 tapered surface
57 aperture
58 tab
60 fastener
62 opening
64 light module
66 printed circuit board
67 fins
68 light engine location feature
70 notched region
72 locating feature
L longitudinal axis
D gap
G gap

We claim:

1. A light guide fixture system comprising:
   a light guide having a light entrance window, a light exit face, and a mounting surface, said mounting surface comprising at least one mounting feature, and at least one locating feature configured to engage with a corresponding locating feature of a light module and align said light entrance window in a predetermined position with respect to a light-emitting element of said light module; and
   a fixturing cassette including at least one mounting feature and a mounting region, said fixturing cassette further defining a cassette light guide-receiving region configured to receive at least a portion of said mounting surface therein;
   wherein said at least one mounting feature of said light guide and said at least one mounting feature of said fixturing cassette are configured and cooperate to allow translational motion of said fixturing cassette relative to said light guide when said light guide is received in said cassette light guide-receiving region of said fixturing cassette and before said fixturing cassette is secured to a component of said light guide fixture system while allowing said light entrance window of said light guide to remain in said predetermined position relative to said light-emitting element when said at least one locating feature of said light guide engages said locating feature of said light module, wherein after said fixturing cassette is mounted to said component of said light guide fixture system, said light guide becomes fixed in said predetermined position relative to said light-emitting element;
   wherein said at least one locating feature of said light guide comprises a wall defining an elongated or non-circular aperture, said at least one mounting feature of said fixturing cassette comprises a protrusion that is received in said elondated or non-circular aperture and cooperates therewith to allow such translational movement.

2. The light guide fixture system of claim 1, wherein said at least one mounting feature of said light guide is selected from a group consisting of apertures and protrusions.

3. The light guide fixture system of claim 2, wherein said at least one mounting feature of said light guide includes said aperture.

4. The light guide fixture system of claim 3, wherein said aperture includes an elongated slot and wherein said protrusion includes a boss.

5. The light guide fixture system of claim 4, further comprising a fastener configured to extend through said at least one mounting feature of said light guide and said fixturing cassette.

6. The light guide fixture system of claim 4, wherein said at least one mounting feature of said light guide and said fixturing cassette includes a tapered surface configured to urge said at least one locating feature towards said corresponding locating feature of said light module.

7. The light guide fixture system of claim 1, wherein said light module includes said light-emitting element, a printed circuit board, and a heat sink, and wherein said mounting region is configured to fixedly mount said light guide fixture system to said heat sink.

8. The light guide fixture system of claim 1, wherein said light module includes said light-emitting element and a thermally conductive printed circuit board, and wherein said mounting region is configured to fixedly mount said light guide fixture system to said thermally conductive printed circuit board.

9. The light guide fixture system of claim 1, wherein said at least one locating feature includes a pin.

10. The light guide fixture system of claim 9, wherein said at least one locating feature further includes a shoulder configured to provide a predetermined gap (G) between said light entrance window and said light-emitting element when said at least one locating feature is aligned in a corresponding locating feature of said light module.

11. The light guide fixture system of claim 1, wherein said fixturing cassette comprises a first portion and a second portion, wherein light guide-receiving region is defined by a compartment formed between said first and second portions, said light guide being sandwiched between said first and second portions.

12. The light guide fixture system of claim 1 in combination with said light-emitting element, wherein said light entrance window is in register with said light-emitting element.

13. The light guide fixture system of claim 1, wherein said fixturing cassette further includes a notched region configured to provide space for said light-emitting element when said fixturing cassette is secured to said light module.

14. The light guide fixture system of claim 1, wherein said at least one mounting feature of said light guide is located in a dead zone of said light guide.

15. A method of locating and fixing a light guide relative a light-emitting element of a light module, said method comprising:
   providing a light guide having a light entrance window, a light exit face, and a mounting surface, said mounting surface comprising at least one mounting feature and at least one locating feature;
   providing a fixturing cassette including at least one mounting feature and a mounting region, said fixturing cassette further defining a cassette light guide-receiving region configured to receive at least a portion of said mounting surface therein;
   aligning said at least one locating feature of said light guide with a corresponding locating feature of a light module to align said light entrance window in a predetermined position with respect to a light-emitting element of said light module;
   when said light guide is received in said cassette light guide-receiving region, translating said fixturing cassette relative said light guide such that said mounting region is aligned with and secured to said light module while maintaining said light entrance window of said light guide in a predetermined position relative to said light-emitting element;
   securing said fixturing cassette to said light module; and
   clamping said fixturing cassette against said mounting surface to secure said light guide to said light module;
   wherein said at least one locating feature of said light guide engages said locating feature of said light module, wherein after said fixturing cassette is mounted to a component of a light guide fixture system, said light guide becomes fixed in said predetermined position relative to said light-emitting element:

wherein said at least one locating feature of said light guide comprises a wall defining an elongated or non-circular aperture, said at least one mounting feature of said fixturing cassette comprises a protrusion that is received in said elongated or non-circular aperture and cooperates therewith to allow such translational movement.

16. The method of claim 15, wherein securing said fixturing cassette against said mounting surface includes securing a fastener extending through said at least one mounting feature of said light guide and said fixturing cassette.

17. The method of claim 15, wherein at least one of said at least one mounting feature of said light guide and said fixturing cassette includes a tapered surface, said method further comprising urging said at least one locating feature towards said corresponding locating feature of said light module by way of said tapered surface.

18. The method of claim 15, wherein said light module includes said light-emitting element, a printed circuit board, and a heat sink, and wherein said mounting region is configured to fixedly mount said light guide fixture system to said heat sink.

19. The method of claim 15, wherein said fixturing cassette comprises a first portion and a second portion and wherein light guide-receiving region is defined by a compartment formed between said first and second portions, said method further comprising receiving said light guide between said first and second portions.

20. The method of claim 15, wherein said at least one mounting feature of said light guide is located in a dead zone of said light guide.

21. The light guide fixture system of claim 1, wherein said component is a heat sink.

* * * * *

UNITED STATES PATENT AND TRADEMARK OFFICE
CERTIFICATE OF CORRECTION

PATENT NO. : 9,052,095 B2
APPLICATION NO. : 13/632496
DATED : June 9, 2015
INVENTOR(S) : Orisch et al.

It is certified that error appears in the above-identified patent and that said Letters Patent is hereby corrected as shown below:

ON THE TITLE PAGE

Item [57] line 2, after "includes" please delete "and".

Item [57] line 5, delete "and" and insert -- to -- therefor.

IN THE SPECIFICATION

Column 8, line 29, delete "thought" and insert -- through -- therefor.

Signed and Sealed this
Twenty-fourth Day of November, 2015

Michelle K. Lee
*Director of the United States Patent and Trademark Office*